US012338185B1

(12) United States Patent
Benson (10) Patent No.: US 12,338,185 B1
(45) Date of Patent: Jun. 24, 2025

(54) SYSTEMS AND METHODS FOR PLASMA SPRAY FABRICATION OF TEXTURED CERAMICS

(71) Applicant: The United States of America as represented by the Secretary of the Navy, Keyport, WA (US)

(72) Inventor: Chase A Benson, Bremerton, WA (US)

(73) Assignee: The United States of America as represented by the Secretary of the Navy, Keyport, WA (US)

(*) Notice: Subject to any disclaimer, the term of this patent is extended or adjusted under 35 U.S.C. 154(b) by 57 days.

(21) Appl. No.: 18/119,678

(22) Filed: Mar. 9, 2023

Related U.S. Application Data

(60) Provisional application No. 63/329,465, filed on Apr. 10, 2022.

(51) Int. Cl.
*C04B 41/45* (2006.01)
*C04B 35/468* (2006.01)
*C04B 41/00* (2006.01)

(52) U.S. Cl.
CPC ........ *C04B 41/4527* (2013.01); *C04B 35/468* (2013.01); *C04B 41/0081* (2013.01); *C04B 2235/3236* (2013.01); *C04B 2235/528* (2013.01); *C04B 2235/5292* (2013.01); *C04B 2235/963* (2013.01)

(58) Field of Classification Search
CPC .............. C04B 41/4527; C04B 35/468; C04B 41/0081; C04B 2235/3236; C04B 2235/528; C04B 2235/5292; C04B 2235/963
See application file for complete search history.

(56) References Cited

U.S. PATENT DOCUMENTS

2014/0329021 A1* 11/2014 Lima .................... C04B 41/009
427/446
2016/0251249 A1* 9/2016 Backhaus-Ricoult ......................
C04B 35/443
428/116

OTHER PUBLICATIONS

Park, Seung-Eek. and Shrout, T.R., Characteristics of Relaxor-Based Piezoelectric Single Crystals for Ultrasonic Transducers, IEEE Transactions on Ultrasonics, Ferroelectrics, and Frequency Control, Sep. 1997, pp. 1140-1147, vol. 44(5), IEEE, New York, United States of America.

(Continued)

*Primary Examiner* — Michael G Miller
(74) *Attorney, Agent, or Firm* — Stephen J. Leahu; Naval Undersea Warfare Center, Keyport (57) ABSTRACT

Devices, systems and methods are provided to fabricate ceramic templates adapted for the production of textured ceramics. Embodiments may include a lidded canister loaded with ceramic particles, pressurized inert gas adapted to force the ceramic particles through the canister, a rotatable plate at an end of the canister, a particle tube connecting the end of the canister to a plasma torch, and a plasma arc at an end of the plasma torch heated to a temperature for melting the ceramic particles. A ceramic plasma spray may be generated that is adapted to coat a substrate with a non-equilibrium film, resulting in a ceramic template adapted for the production of textured ceramics.

11 Claims, 9 Drawing Sheets

(56) References Cited

OTHER PUBLICATIONS

Park, Seung-Eek and Shrout, T.R., Ultrahigh strain and piezoelectric behavior in relaxor based ferroelectric single crystals, Journal of Applied Physics, Aug. 1997, pp. 1804-1811, vol. 82(4), American Institute of Physics, United States of America.

Brosnan, Kristen H., Processing, Properties, and Applications of Textured 0.72Pb(Mg1/3Nb2/3)O3-0.28PbTiO3 Ceramics, May 2007, pp. i-xx and 1-225, Dept. of Materials Science and Engineering, The Pennsylvania State University, University Park, PA, United States of America.

Sabolsky, E.M., James, A.R., et.al, Piezoelectric properties of textured Pb(Mg1/3Nb2/3)O3-PbTiO3 ceramics, Applied Physics Letters, Apr. 2001, pp. 2251-2553, vol. 78(17), American Institute of Physics, United States of America.

Sabolsky, E.M., Kwon, S., et al., Dielectric and Electromechanical Properties of Textured (0.68)Pb(Mg1/3Nb2/3)-(0.32)PbTiO3, Dept. of Materials Science and Engineering, The Pennsylvania State University, 12th IEEE International Symposium on Applications of Ferroelectrics, 2001, pp. 393-396, IEEE, New York, United States of America.

Messing, G.L., Trolier-Mckinstry, S., et. al., Templated Grain Growth of Textured Piezoelectric Ceramics, Materials Research Institute and Department of Materials Science and Engineering, Pennsylvania State University, Critical Reviews in Solid State and Materials Sciences, 2004, pp. 45-96, vol. 29(2), Taylor & Francis Inc, England.

Damjanovic, Dragan, Ferroelectric, dielectric and piezoelectric properties of ferroelectric thin films and ceramics, Reports on Progress in Physics, 1998, pp. 1267-1324, vol. 61(5), Laboratory of Ceramics, Department of Materials Science, Swiss Federal Institute of Technology, IOP Publishing Ltd, United Kingdom.

Poterala, Stephen F., Closing the Performance Gap Between Textured PMN-PT Ceramics and Single Crystals, May 2012, pp. i-xviii and 1-232, Dept. of Materials Science and Engineering, The Pennsylvania State University, University Park, PA, United States of America.

Sampath, Sanjay, Thermal Spray Applications in Electronics and Sensors: Past, Present, and Future, Journal of Thermal Spray Technology, Sep. 2009, pp. 921-949, vol. 19(5), Springer Science+Business Media, Berlin, Germany.

Yang, Er-Juan, Luo, Xiao-Tao, et al., Impact of deposition temperature on crystalline structure of plasma-sprayed Al2O3 splats revealed by FIB-HRTEM technique, Ceramics International, Sep. 2015, pp. 853-860, vol. 42(1), Elsevier Ltd, Netherlands.

Yao, S.-W., Liu, T., et al., Epitaxial growth during the rapid solidification of plasma-sprayed molten TiO2 splat, Acta Materialia, May 2017, pp. 66-80, vol. 134, Elsevier Ltd, Netherlands.

Liu, Z., Xing, Z., et al., Fabrication and post heat treatment of 0.5Pb (Mg1/3Nb2/3)O3-0.5Pb(Zr0.48Ti0.52)O3 coatings by supersonic plasma spray, Journal of the European Ceramic Society, Apr. 2017, pp. 3511-3519, vol. 37, Elsevier Ltd, Netherlands.

Minchina, M.G., and Dudkevich, V.P., Piezoelectric properties of oriented Z' cuts of PZT-type ferroelectric ceramics, Technical Physics, Jul. 1998, pp. 814-817, vol. 43(7), American Institute of Physics, United States of America.

Vaudin, M., Rupich, M., et al., A Method for Crystallographic Texture Investigations Using Standard X-Ray Equipment, Journal of Materials Research, Oct. 1998, pp. 2910-2919, vol. 13(10), Springer Science+Business Media, Berlin, Germany.

Kirby, K.W., and Wechsler, B.A., Phase Relations in the Barium Titanate-Titanium Oxide System, Journal of the American Ceramic Society, Aug. 1991, pp. 1841-1847, vol. 74(8), Wiley-Blackwell, United States of America.

Yu, J., Paradis, Paul-Francois, et al., Synthesis of barium titanate by electrostatic levitation, Journal of Crystal Growth, Sep. 2004, pp. 515-519, vol. 273(3-4), Elsevier Ltd., Netherlands.

Wu, Yu-Chuan, and Lu. Hong-Yang, Crystallographic Orientation Relationships Between Hexagonal and Tetragonal Barium Titanate, Journal of the American Ceramic Society, Nov. 2005, pp. 3154-3161, vol. 88(11), Wiley-Blackwell, United States of America.

\* cited by examiner

SYSTEMS AND METHODS FOR PLASMA SPRAY FABRICATION OF TEXTURED CERAMICS

CROSS REFERENCE TO RELATED APPLICATION

This non-provisional patent application claims priority to, and incorporates herein by reference in its entirety, U.S. Provisional Patent Application No. 63/329,465 that was filed Apr. 10, 2022.

STATEMENT OF GOVERNMENT INTEREST

The embodiments of the present disclosure may be manufactured and used by or for the Government of the United States of America for governmental purposes without the payment of any royalties thereon or therefor.

FIELD OF THE DISCLOSURE

The present disclosure relates in general to the fields of textured ceramics and plasma sprays, and in particular to systems and methods and apparatuses for the fabrication of ceramic seed templates using a plasma spray.

BACKGROUND

Basic techniques for the fabrication of textured ceramics are known in the art. Improved solutions are desired for a fabrication process for textured ceramic templates. Features of the present disclosure overcome various deficiencies of the prior art by providing a method, system and apparatus having advantages that will become apparent from the following disclosure.

BRIEF SUMMARY OF THE DISCLOSURE

The following presents a simplified summary of the disclosure in order to provide a basic understanding of some aspects of the disclosure. This summary is not an extensive overview of the disclosure. It is intended neither to identify key or critical elements of the disclosure, nor to delineate the scope of the disclosure. Its sole purpose is to present some concepts, in accordance with the disclosure, in a simplified form as a prelude to the more detailed description presented herein.

According to one technical advantage, the disclosed systems and methods and apparatuses may utilize a plasma torch to transform spherical barium titanate ceramic particles into desired disk-like, anisometric particles with preferential crystallographic orientation for use as templates in textured ceramic production. An anisometric particle may enable crystal growth having unequal axes length. The crystallographic orientation, or the orientation of the atoms in the crystals, may be in the same direction. A benefit of the disclosure may include the production of templates evenly with unique configurations that have a higher quality and production as compared to those made by prior methods and tools.

In certain embodiments, thermal and kinetic energy and a precise cooling process may promote crystal growth of a desired orientation that may be utilized to create usable ceramic seed templates. The orientation of the crystals may be controlled, in accordance with the present disclosure. Thermal and kinetic energy created from the use of a plasma torch combined with a precise cooling process may facilitate maximum control of the crystal growth process. Accordingly, more usable seed templates may be produced for industrial usage. In some embodiments, the present disclosure may result in a higher production yield over prior methods and techniques. Further advantages and features of the present disclosure are illustrated in the drawings and described in detail below.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same components throughout the various views. The drawings are not necessarily to scale, emphasis instead being placed upon illustrating principles of the present disclosure.

DETAILED DESCRIPTION

Textured ceramics are used in many places throughout modern society, from transducers to medical implants to capacitors. Such textured ceramics may be grown on templates. Past methods for creating the templates, however, are slow and produce a low yield of templates that may be used for commercial purposes. Those conventional techniques often created templates based on methods that utilize chemical solutions, crucibles, and pressurized reactors. Each of those methods were, by nature of their procedures and materials, limited to the production of small batches. The yield of such templates are limited by the nature of the processes available for use: crucibles can only be made so large and chemicals appropriate for seed templates may only be used in small quantities.

Another issue often resulting from past methods is the type of crystals produced for usage as templates for textured ceramic growth. Equiaxed crystallites, or crystals that are either cube or spherical in shape, were often formed that could be used to grow templates because a flat disk-like structure may be required. To overcome such deficiencies, additional processes were required by past techniques in order to shave down the cubic or spherical crystals and obtain the desired disk-like structure with desired chemical composition and crystal orientation, also referred to as crystallographic orientation. Due to the small batches and the potential for mishap during such post-fabrication processes, a relatively small number of useful seed templates could be created for industrial/commercial purposed given the drawbacks of such techniques.

A chemical solution is often used for the creation of the templates that first form on a substrate suspended in the solution, similar to the manner in which rock candy is formed in sugar water around a suspended string. Past techniques were limited to usage of only a small amount of a ceramic powder. After the solution created the initial crystals, another chemical process would usually be used to create the disk-like structures needed for seed templates for textured ceramics. Such complicated and slow processes that were utilized in the past often measured production in grams per hour.

In comparison, the present disclosure may enable usage of more barium titanate ceramic particles at one time, which may be measured in grams per minute during production. A high grams per minute production may result from the utilization of plasma torches or plasmatrons. The substrate, onto which the ceramic particles are sprayed, may also be larger than was possible when using the prior techniques. As more of the barium titanate ceramic particles are used with a larger substrate, a higher yield of usable templates may be created utilizing the plasma torch in accordance with the present disclosure.

Reference will now be made in detail to the embodiments of the present disclosure, examples of which are illustrated in the accompanying drawings. The present disclosure may be embodied in various forms, including a method, a system, a device or apparatus for plasma spray fabrication 100 of ceramic templates as described in detail below. In some embodiments, the fabrication process 100 may be performed by the exemplary apparatus or device 1 depicted in FIGS. 1 and 3-4, that may be based on the exemplary steps shown in the flowchart of FIG. 8, and may be controlled by the exemplary system illustrated in FIG. 9 in order to produce the exemplary end-products 2 characterized in FIGS. 2 and 5-7.

Figure 1:
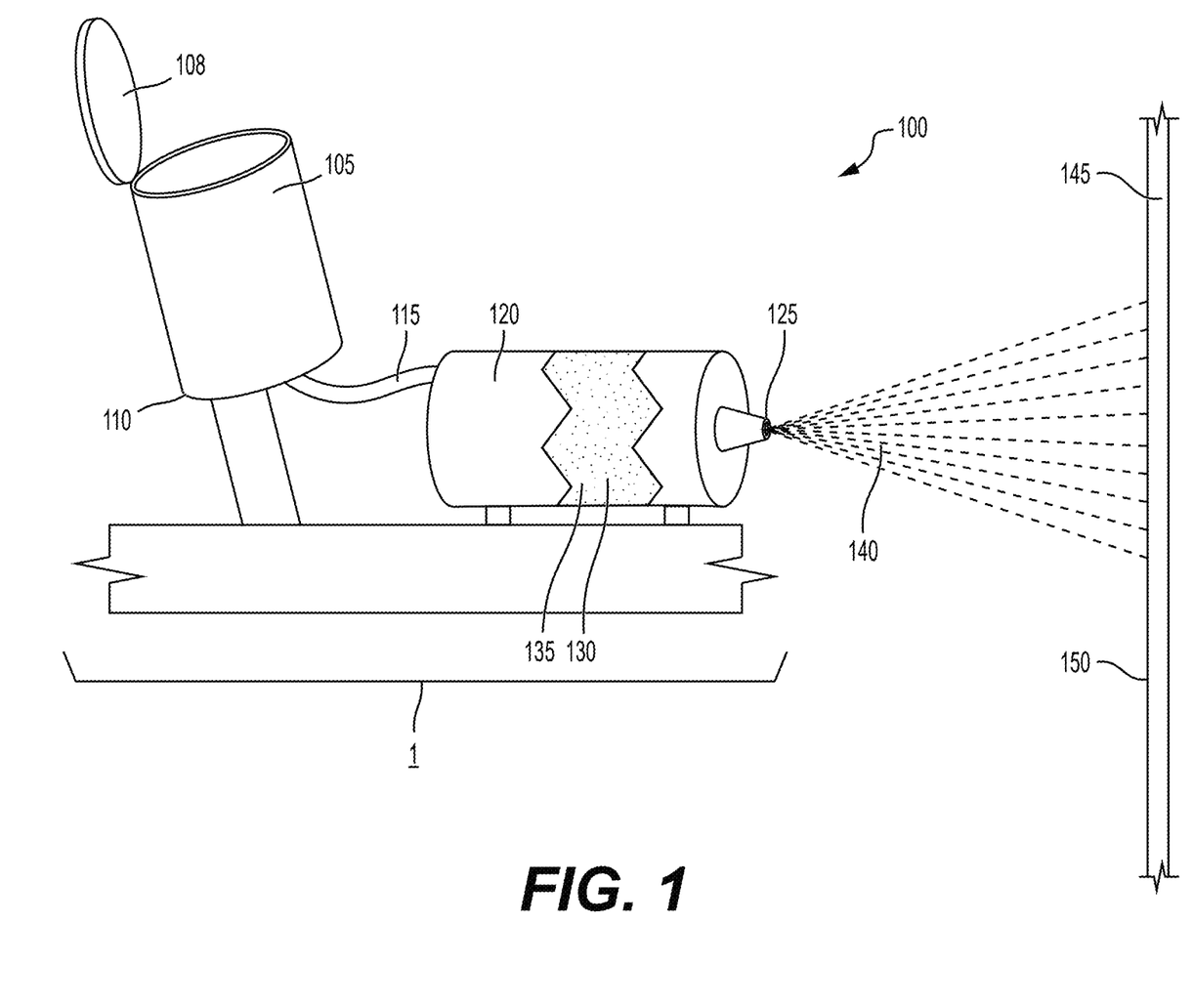
FIG. 1 is an illustration for an example of plasma spray fabrication, in accordance with certain embodiments of the present disclosure.
Figure 2:
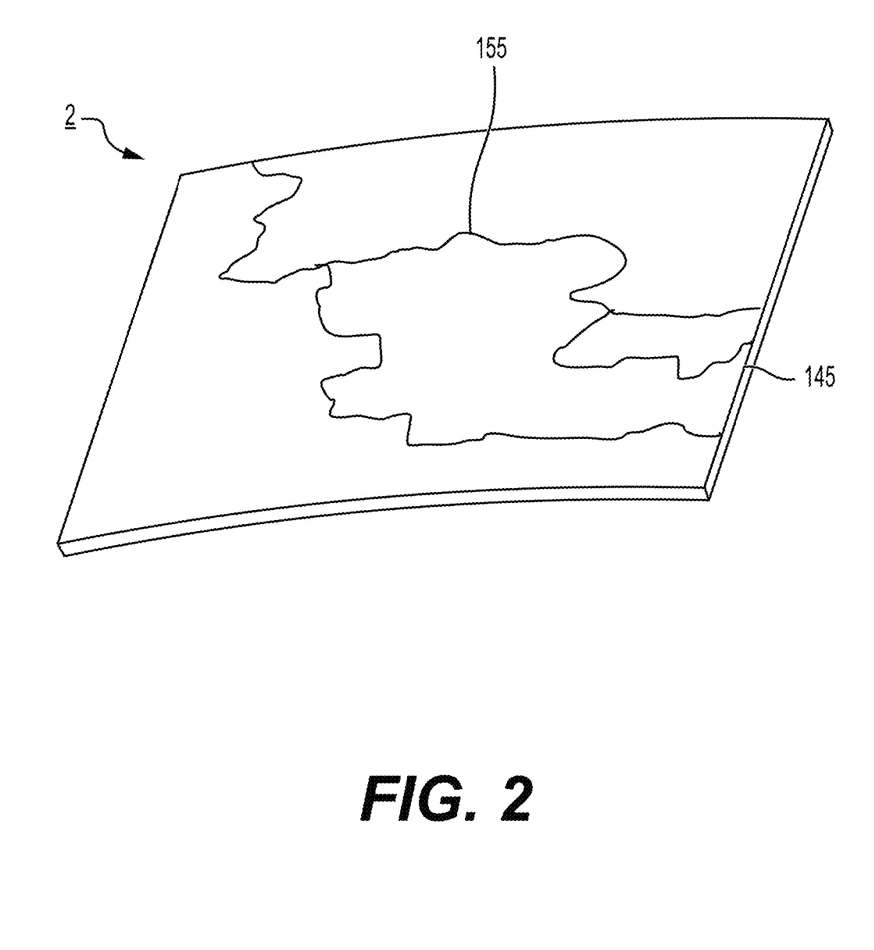
FIG. 2 is an illustration of an exemplary end product of ceramic seed templates produced utilizing the fabrication example depicted in FIG. 1, in accordance with certain embodiments of the present disclosure.

The plasma spray fabrication process 100 may be utilized to transform spherical ceramic particles into desired seed template disks. Referring to FIG. 1, such fabrication 100 may performed using an apparatus 1 comprising a canister 105, canister lid 108, rotating plate 110, particle tube 115, plasma torch 120, plasma arc 125, ceramic particles 130, inert gas 135, ceramic plasma spray 140, prepared substrate 145, and non-equilibrium film 150. FIG. 2 illustrates the end product 2 of plasma spray fabrication process 100, which may result in an end product 2 comprising a ceramic seed template 155. Such a ceramic seed template 155 is discussed in further detail below.

Figure 3:
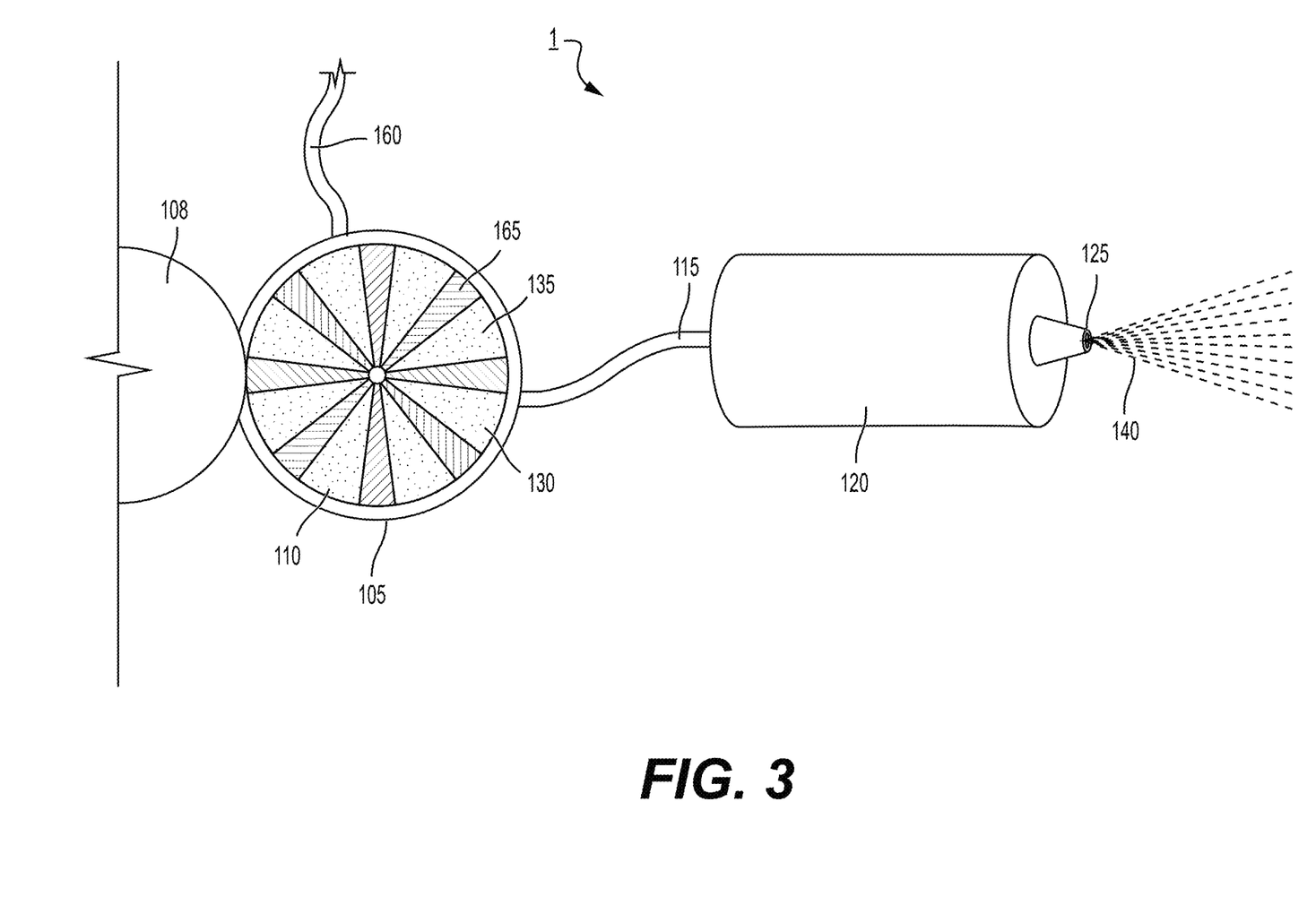
FIG. 3 is a top view illustrating the exemplary movement of ceramic particles through a plasma torch, in accordance with certain embodiments of the present disclosure.

Referring to FIG. 3, the canister 105 may be loaded with ceramic particles 130 that flow through a plasma torch 120. The ceramic particles 130 may comprise barium titanate ceramic particles 130, and may be spherical. Barium titanate, or BTO, may comprise an inorganic compound with the chemical formula $BaTiO_3$. The canister 105 may be connected to a plasma torch 120 via a particle tube 115, which may permit ceramic particles 130 to exit the canister 105 and enter the plasma torch 120. The canister 105 may be positioned at a 45 degree angle in relation to the plasma torch 120, as shown. Such a 45° angle may facilitate the flow of particles through the canister 105 to a rotating plate 110 without interruption. Loading the canister 105 may be done manually or automatically, such as robotically, depending on the environment and application.

In some embodiments, when the canister 105 is closed by a canister lid 108, inert gas 135 at 60 pressure per square inch (psi) may flow from an inert gas tube 160 into and through the canister 105 in order to assist the barium titanate ceramic particles 130 to flow down the canister 105 to a rotating plate 110. The rotating plate 110 may be located within the canister 105 near the bottom end of the canister 105, or at an exterior side of an opening of the canister 105. In an embodiment, the canister 105 may comprise a stem or pipe portion location at or near the bottom end of the canister 105. The canister 105, and/or its stem or pipe portion, may directly or indirectly couple or connect to the plasma torch 120. Accordingly, the inert gas 135 and the barium titanate ceramic particles 130 may fluidly flow from the canister 105 to the plasma torch 120. The inert gas 135 may be pressurized to an appropriate pressure per square inch (psi) based on the type of gas utilized. This determination is well known to those skilled in the art, and will be dependent on the specific inert gas being used combined with the amplitude and voltage of the plasma torch in use. For example, if argon is used as the inert gas 135 and the plasma torch 120 uses 700 amps and 25 volts, a pressure of 60 psi is sufficient enough to heat the barium titanate ceramic particles 130 to their melting point of 1625 degrees Celsius.

An inert gas 135 such as argon may be used in the plasma spray fabrication process 100. If a reactive gas is used, a new molecule will be created. For example, if chlorine gas is used, the barium titanate ceramic particles 130 may bond with it creating the molecule barium chloride, which is a very toxic salt and not a ceramic. Such a new molecule will have a different electron makeup, and may negatively affect the electronics of ceramic seed templates 155.

Barium titanate ceramic particles 130 may be used in the plasma spray fabrication process 100 because the chemical structure of barium titanate ceramic particles 130 may facilitate the correct crystallographic orientation 3 in the end product 2, i.e. the ceramic seed template 155. The crystallographic orientation 3 may refer to the direction of the atoms once barium titanate ceramic particles 130 are cooled. In the plasma spray fabrication process 100, the preferred crystallographic orientation 3 is flat or disk-like and in the same direction. In prior techniques, other ceramic powders such as a lead-based ceramic powder were usually used. However, using lead-based ceramic powders in plasma spray fabrication process 100 would create lead oxide when it is heated to its melting point, requesting in a toxic environment. Such prior techniques using lead-based ceramic powders required an additional chemical process to avoid creating large amounts of lead oxide.

In certain embodiments, the inert gas 135 may flow through canister 105 assisting barium titanate ceramic particles 130 to flow down to rotating plate 110. Grooves 165 in a rotating plate 110 may catch barium titanate ceramic particles 130 and funnel them into the particle tube 115 along with inert gas 135. The inert gas 135 and barium titanate ceramic particles 130 may pass through a plasma arc 125. The plasma arc 125 may heat the inert gas 135 to an appropriate temperature to melt barium titanate ceramic particles 130 at their melting point, generating a ceramic plasma spray 140.

Figure 4:
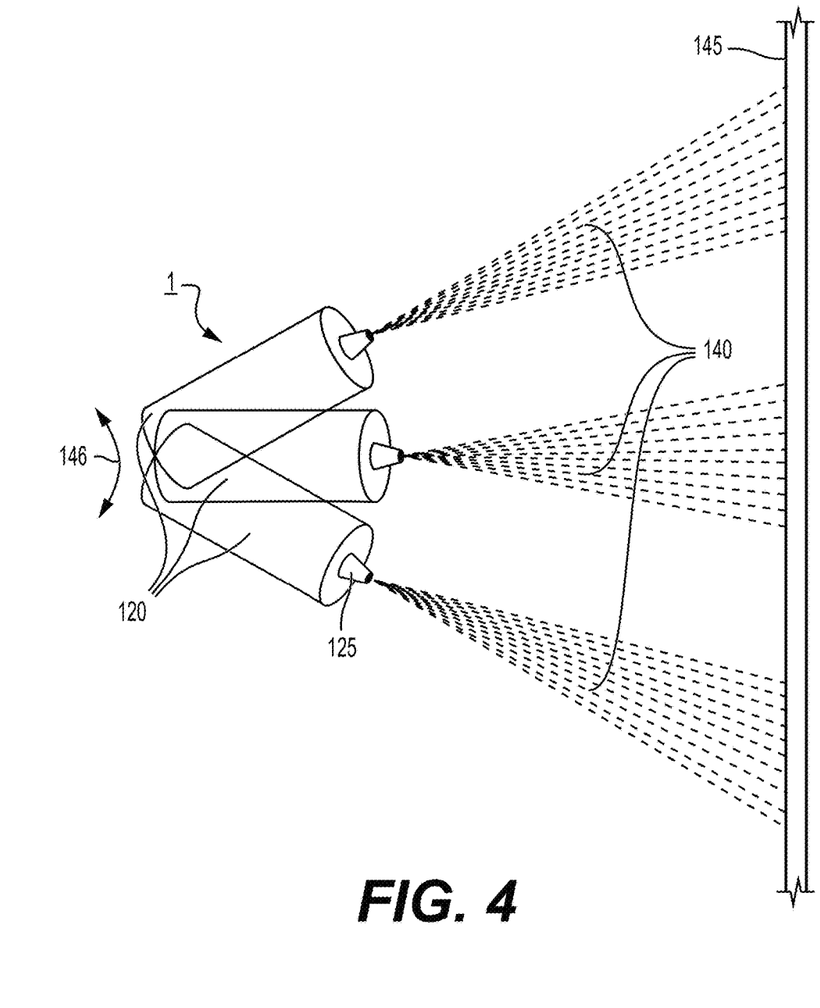
FIG. 4 is an illustration of an example of the application of plasma to a prepared substrate, in accordance with certain embodiments of the present disclosure.

The combination of the pressure of the inert gas 135 and the heat generated from heating inert gas 135 and barium titanate ceramic particles 130 may propel the ceramic plasma spray 140 toward a prepared substrate 145. A ceramic plasma spray 140 may be sprayed toward the prepared substrate 145 in a sweeping motion 146, as shown in FIG. 4. The sweeping motion 146 may be performed robotically to ensure a smooth and even distribution of ceramic plasma spray 140.

Figure 9:
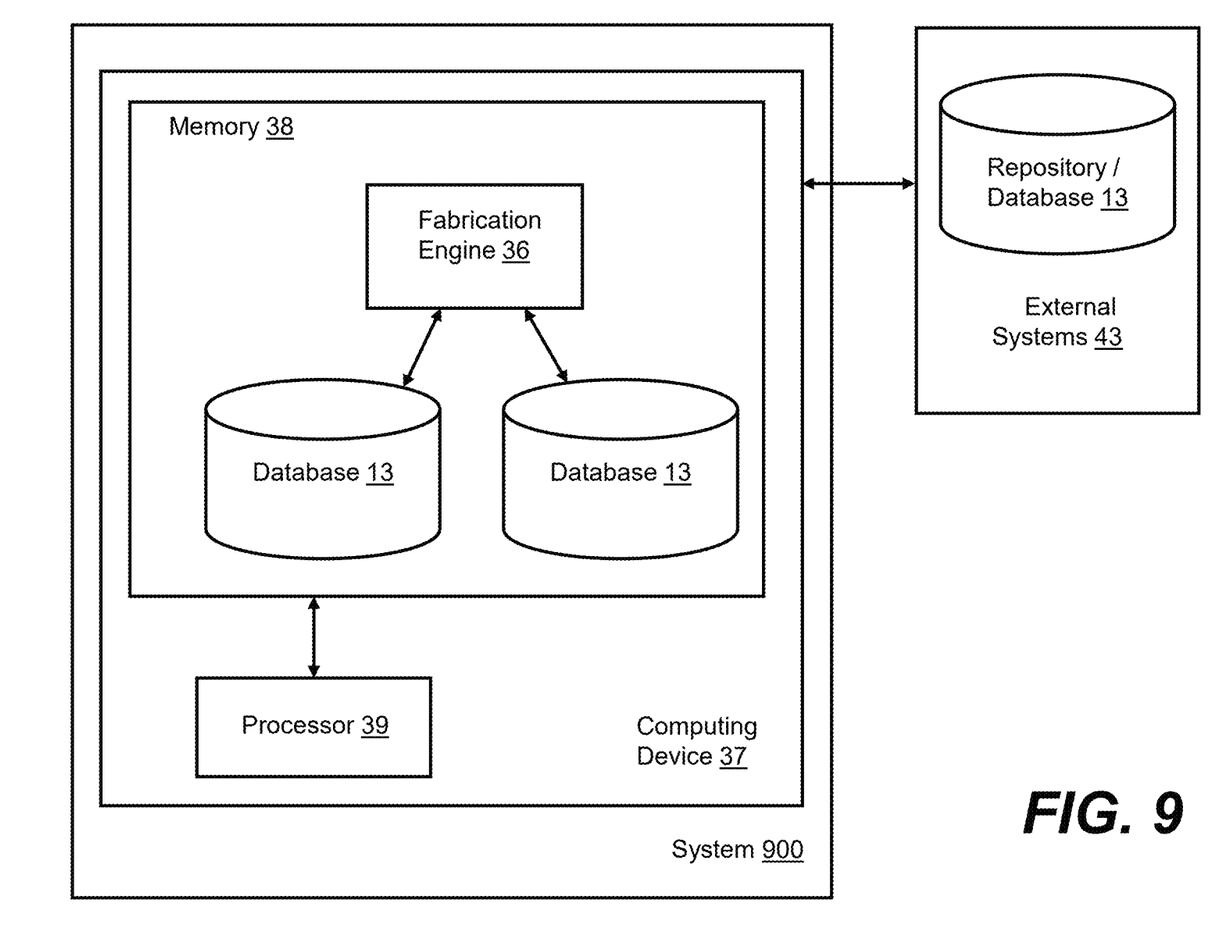
FIG. 9 is a block diagram illustrating components of an exemplary system for implementing and controlling the fabrication example depicted in FIG. 1, in accordance with certain embodiments of the present disclosure.

The sweeping motion 146 of ceramic plasma spray 140 may be controlled the system illustrated in FIG. 9, and performed at a speed of 600 millimeters per second. Referring back to FIG. 4, should the plasma torch 120 move too slowly, the ceramic plasma spray 140 may overlap, creating too thick of a layer and the crystal growth may be equilax or cubic or spherical in shape. Should the plasma torch 120 sweep too quickly, ceramic plasma spray 140 will spread too thinly across prepared substrate 145 leaving gaps as ceramic plasma spray 140 cools, lowering the yield of usable ceramic seed templates 155.

The plasma spray fabrication process 100 may utilize the kinetic energy of the ceramic plasma spray 140 to facilitate the appropriate thickness of the end product 2. The appropriate thickness may be one particle, or 30 microns, thick. A 30 micron thickness may prevent equilax crystal growth. A thickness of more than 30 microns may facilitate crystal orientation into spheres or cubes, which then must be chemically sliced to create a disk-like flatness suitable for industry use. In certain embodiments, the plasma spray fabrication process 100 is designed to eliminate this step when the ceramic seed templates 155 may be required to be flat, or disk-like, to achieve a uniform crystallographic orientation.

Figure 5:
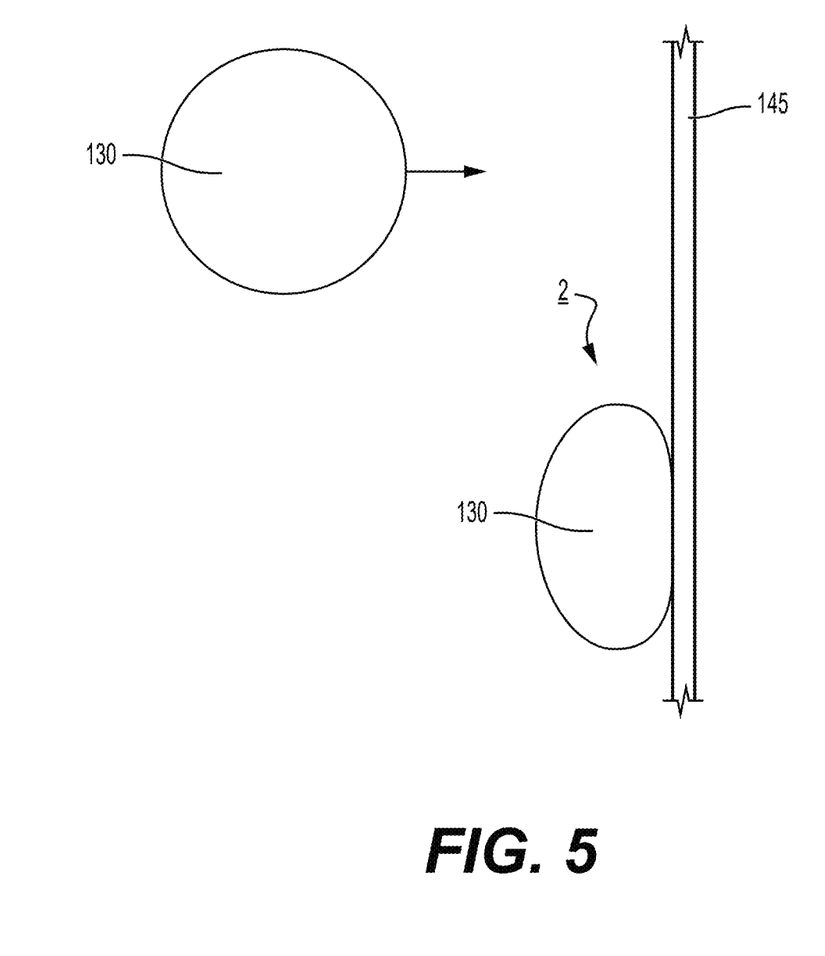
FIG. 5 is a block diagram illustrating the use of kinetic energy in the application of a plasma spray, in accordance with certain embodiments of the present disclosure.

As depicted in FIG. 5, the plasma spray fabrication process 100 may further utilize the kinetic energy of barium titanate ceramic particles 130 via velocity. Barium titanate ceramic particles 130, as a part of the ceramic plasma spray 140, may hit the prepared substrate 145 with enough velocity to spread quickly across the surface. The number of impacts of ceramic plasma spray 140 may be distanced far enough apart to discourage crystal growth in any pattern other than a flat, disk-like one.

The prepared substrate 145 may comprise various materials, including without limitation polycrystalline ceramic, metal, or single crystal piezocrystals. The prepared substrate 145 may be polished down to a 0.05 micron surface texture profile. Such a low profile may permit a smooth surface for the ceramic plasma spray 140 to impact and spread evenly upon the prepared substrate 145, much like a pancake on a smooth griddle or pan. Further, a 0.05 micron surface texture may facilitate a uniform contact between the side of the particle impacting the prepared substrate 145 and the prepared substrate 145 itself. Accordingly, a dominant crystallographic orientation may be promoted.

The ceramic plasma spray 140 may impact the prepared substrate 145 to create a non-equilibrium film 150. The prepared substrate 145 may be heated to between 300 degrees and 900 degrees Celsius. The 300 to 900 degrees Celsius temperature may be a transition temperature before cooling. The prepared substrate 145 may gradually cool under controlled conditions, facilitating uniform crystallographic alignment of non-equilibrium film 150. The controlled cooling may permit a non-equilibrium film 150 to harden as it cools. The controlled cooling must be done at a slow enough rate so that the non-equilibrium film 150 does not cool and harden too fast, creating very brittle ceramic seed templates 155. However, the non-equilibrium film 150 must cool and harden fast enough so as not to remain too soft, creating flimsy ceramic seed templates 155 that are not useful to an end user.

Figure 6:
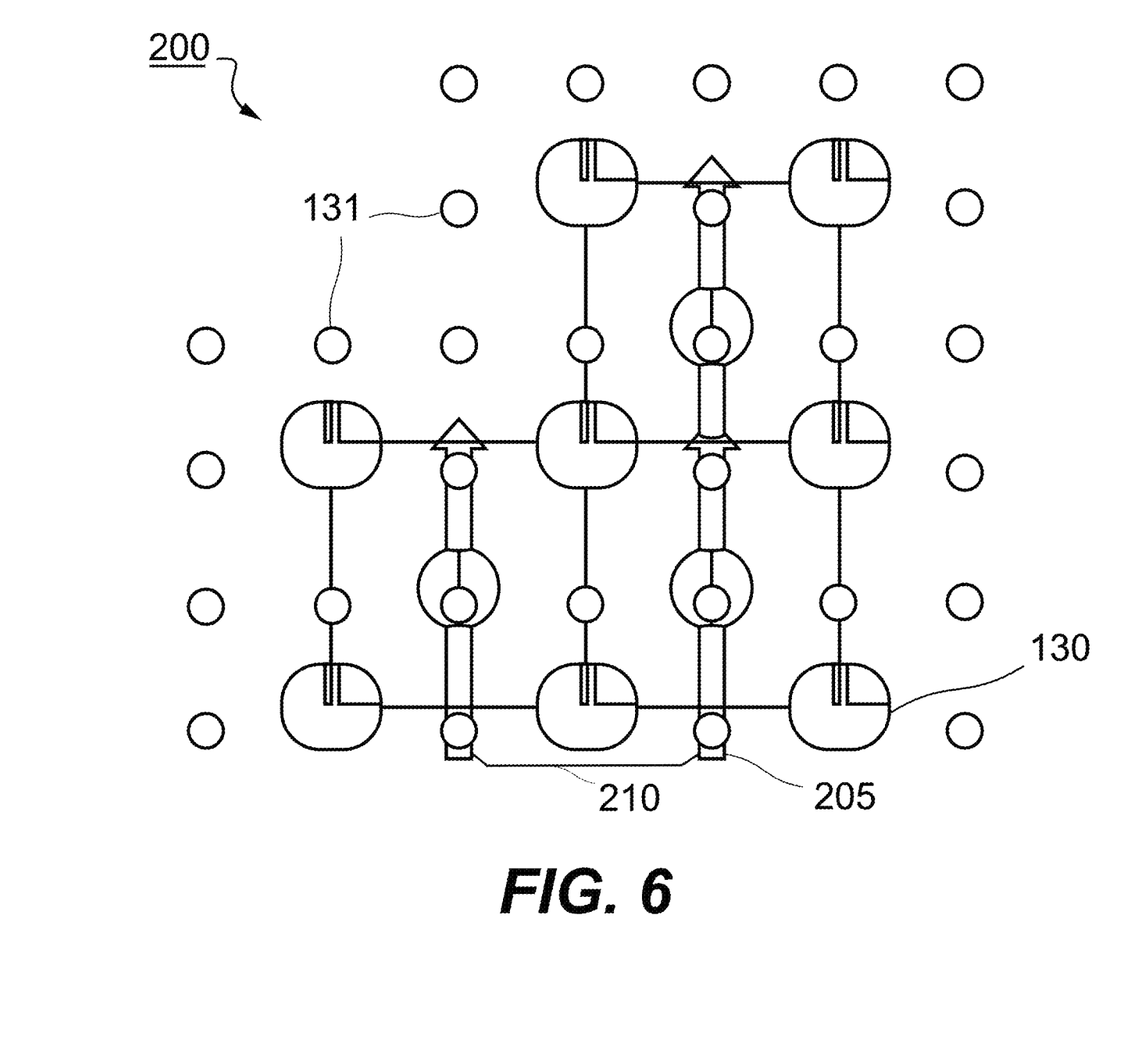
FIG. 6 is an illustration of a desired crystallographic orientation of crystal growth in the end product of ceramic seed templates depicted in FIG. 2 as produced by the fabrication example depicted in FIG. 1, in accordance with certain embodiments of the present disclosure.

Barium titanate particles 130 and oxygen anions 131 may be oriented as illustrated in the crystallographic orientation 200 shown in FIG. 6. At a high-temperature cubic phase described above, barium titanate may comprise a perovskite structure having regular corner-sharing octahedral $TiO_6$ units that define a cube with O vertices and Ti—O—Ti edges with $Ba^{2+}$ located at the center of the cube, as commonly known to those skilled in the art. The desired crystallographic orientation 200 of the atoms for the barium titanate ceramic particles 130 may comprise C-axis poles 205 nearly parallel to one another. The degree of angle between two C-axis poles 205 is commonly known to those skilled in the art as misorientation angle 210. As the misorientation angle 210 is brought to 0 degrees, the quality of the texture improves. Quality of texture is the smoothness of desired crystallographic orientation 200, which may create a higher quality ceramic seed template 155.

Figure 7:
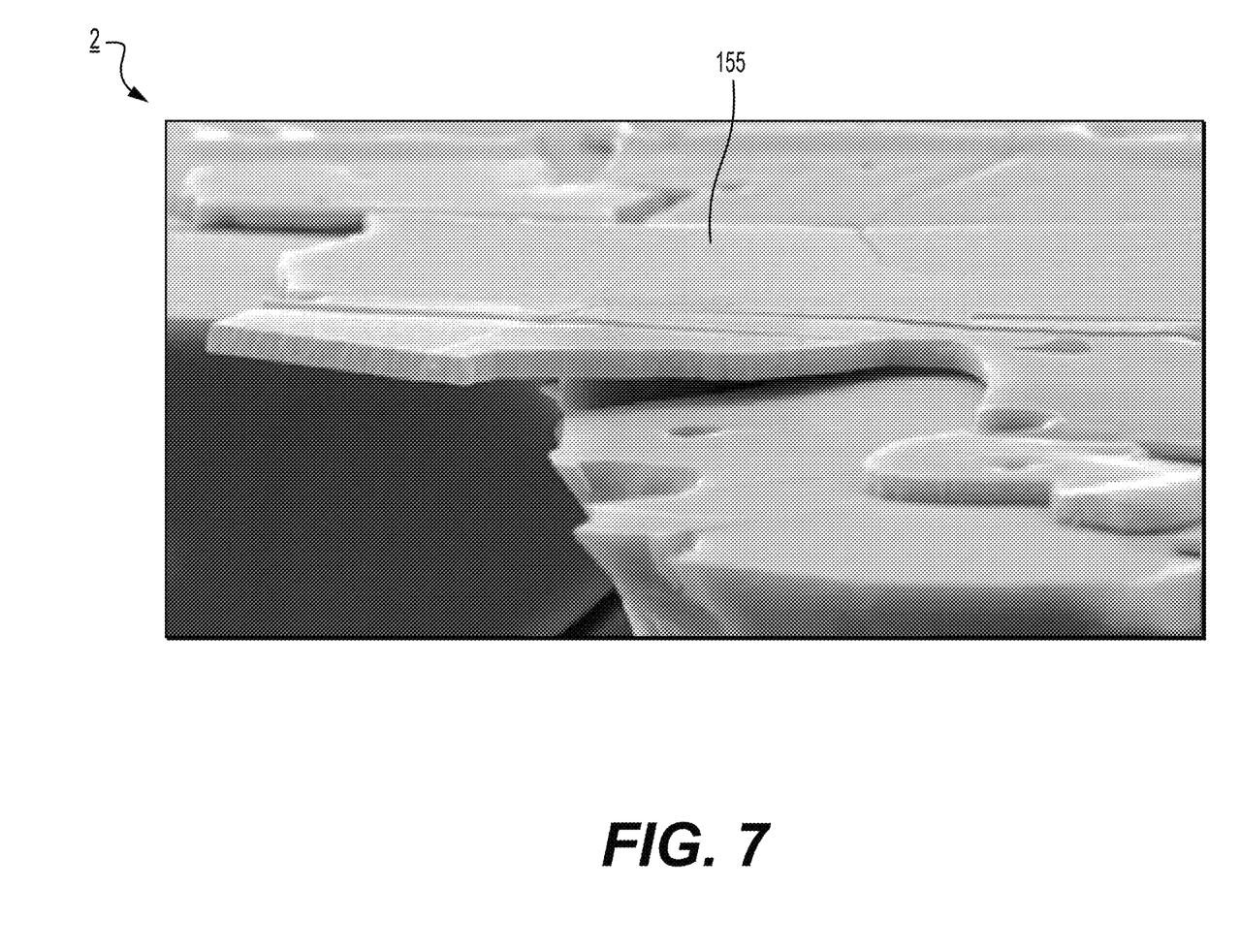
FIG. 7 is a block diagram illustrating an exemplary magnified view of the cross-section of a ceramic seed template, in accordance with certain embodiments of the present disclosure.

As depicted in the illustration of FIG. 7, a magnified cross-section of the ceramic seed template 155 may be 5 microns. The ceramic seed template 155 may be used as a growth template for lead-based textured ceramics. Many types of shapes of ceramic seed template 155 may be made with the plasma spray fabrication process 100, such as equilateral or asymmetrical shapes, depending on their intended use. The plasma spray fabrication process 100 may be used to create a high yield of ceramic seed templates 155 for industry use.

Figure 8:
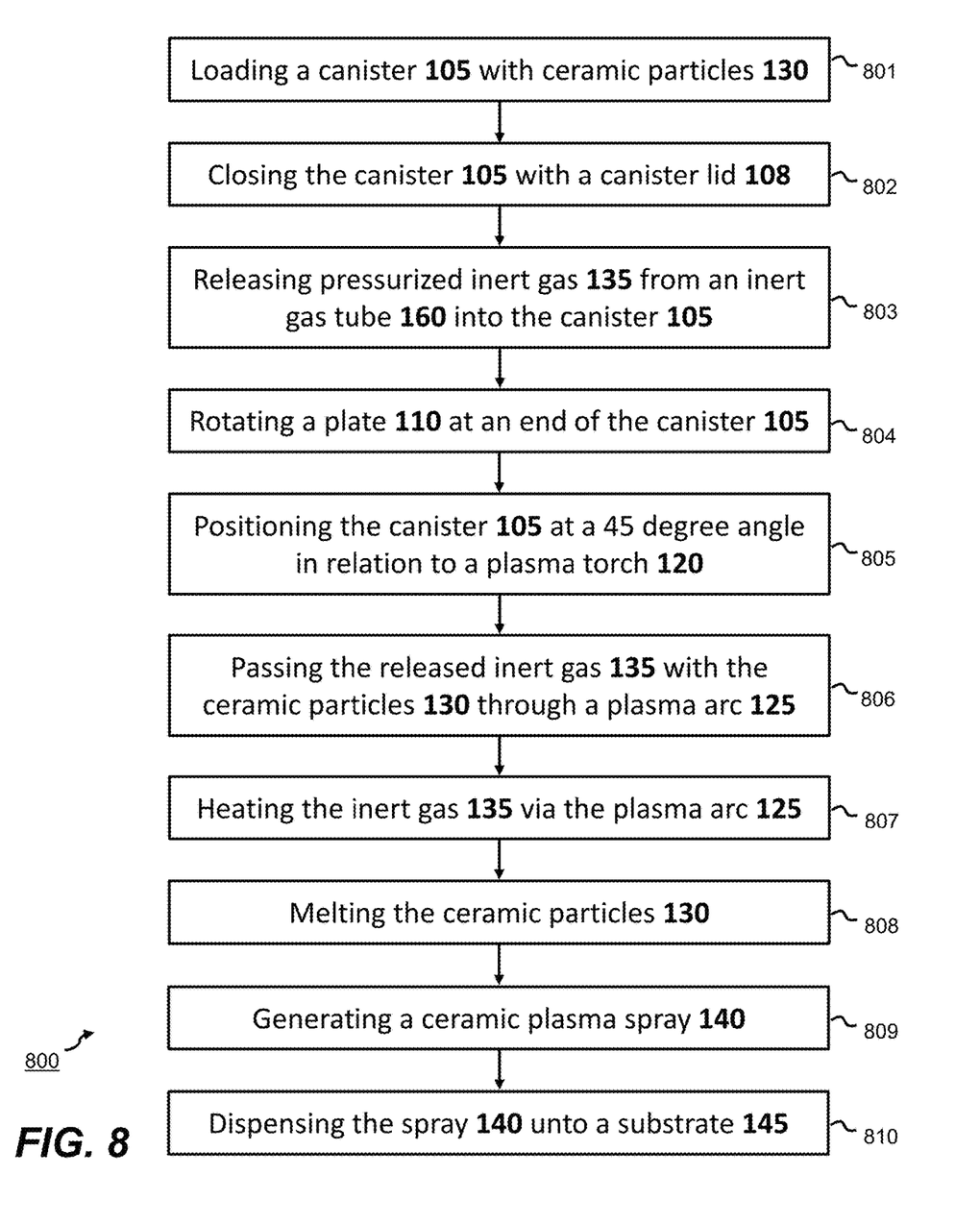
FIG. 8 is a flowchart illustrating exemplary steps of the fabrication example depicted in FIG. 1, in accordance with certain embodiments of the present disclosure.

As illustrated in FIG. 8, a method 800 for the plasma spray fabrication of ceramic seed templates 155 may comprise the steps of: loading [block 801] a canister 105 with ceramic particles 130; closing [block 802] the canister 105 with a canister lid 108; releasing [block 803] pressurized inert gas 135 from an inert gas tube 160 into the canister 105, whereby the ceramic particles 130 are forced through the canister 105 by the inert gas 135; rotating [block 804] a plate 110 at an end of the canister 105, the rotating plate 110 having grooves 165 adapted to accelerate and funnel the ceramic particles 130 into a particle tube 115 together with the released inert gas 135; positioning [block 805] the canister 105 at a 45 degree angle in relation to a plasma torch 120, wherein the canister 105 and the plasma torch 120 are connected via the particle tube 115; passing [block 806] the released inert gas 135 with the ceramic particles 130 through a plasma arc 125 at an end of the plasma torch 120; heating [block 807] the passed inert gas 135 via the plasma arc 125 to a predetermined temperature; melting [block 808] the ceramic particles 130; generating [block 809] a ceramic plasma spray 140; and, dispensing [block 810] the ceramic plasma spray 140 unto a substrate 145.

In accordance with certain embodiments, the dispensing or straying step [block 810] of the method 800 may comprise: propelling [block 811] the ceramic plasma spray 140 toward a predetermined substrate 145, wherein the ceramic plasma spray 140 is propelled in response to the pressure of the inert gas 135 and the heat generated from heating inert gas 135 and ceramic particles 130; directing [block 812] the ceramic plasma spray 140 toward the substrate 145 in a sweeping motion 146, wherein the directed spray 140 impacts the substrate 145 in an even distribution; generating [block 813] a non-equilibrium film 150 on the substrate 145 based on the even distribution of the directed spray 140 via the sweeping motion 146; heating [block 814] the substrate 145 to predetermined transition temperature; cooling [block 815] the heated substrate 145 in a gradual and controlled manner, whereby facilitating hardening and uniform crystallographic alignment of the non-equilibrium film 150.

In some embodiments, the method 800 may further comprise utilization of: kinetic energy from the ceramic plasma spray 140 to facilitate the appropriate thickness of the non-equilibrium film 150 on the predetermined substrate 145; and, kinetic energy of the ceramic particles 130 in the ceramic plasma spray 140 to generate enough velocity to spread quickly across the surface of the predetermined substrate 145. The predetermined substrate 145 may be polished, and comprise polycrystalline ceramic, metal, single crystal piezocrystals or other materials. A benefit of the method 800 includes the transformation of spherical ceramic particles into disk-shaped, anisometric particles with a crystallographic orientation for use as templates in textured ceramic production. In certain embodiments, the present disclosure may be utilized to produce homoepitaxial (i.e., same composition) templates for lead-based systems. Depending upon the composition of the template and the matrix particles, the desired growth may be homoepitaxy or heteroepitaxy.

As discussed above, the system 900 illustrated in FIG. 9 may implement the method 800 to facilitate the dispensing of the ceramic plasma spray 140 unto the substrate 145 in order to achieve a uniform crystallographic orientation of the ceramic seed template. The system 900 may control the steps of the method 800. An embodiment of the disclosed system 900 may be implemented in many different ways, using various components and modules, including any combination of circuitry described herein, such as hardware, software, middleware, application program interfaces (APIs), and/or other components for implementing the corresponding features of the circuitry. In an embodiment, as shown in FIG. 9, the system 900 may include a fabrication engine 36. The system 900 may further comprise a computing device 37, which may include a memory 38 and a processor 39. The system 900 may communicate with remote graphical user interfaces (GUIs) used to facilitate the importation and exportation of data, as well as overriding the controls and operation of the disclosed models. As such, users and administrators (admins) may remotely interface with the system 900 via the GUI. In some embodiments, the memory 38 may include the components and modules of the system 900, including the fabrication engine 36. The fabrication engine 36 may be configured to control the steps of the method 800. The system 900 may also include databases 13, which may comprise relational databases such as a MySQL database or an object-relational database such as a PostgreSQL database. The databases 13 may be stored in the memory 38 of the system 7, or distributed across multiple devices, processing systems, or repositories. For example, the computing device 37 may be configured to communicate with various external systems 43 that may comprise private repositories or databases 13. The computing device 37 may directly communicate with a database 13.

According to certain embodiments, the systems and methods and apparatuses described above may utilize use modeling techniques to (1) establish a stable regime for epitaxial growth in competition with heterogeneous nucleation, (2) predict substrate compatibility, and (3) identify the thermal conditions that promote fiber texture in individual droplets. In some embodiments, modeling bulk properties may be based upon expected texture fraction, misorientation angle, and clamping effect from template loading. In an embodiment, the key parameters may include substrate temperature, crystallographic orientation, crystal face growth velocity, and heterogeneous nucleation rate. Models and techniques may include an effective moduli and finite element analysis. The modeling techniques may be based on Lot-gering factor, f, as an estimate of the degree of orientation in the textured material. Models may be combined with an analytical expression for an arbitrary rotation of any 2nd or 3rd rank material property tensor, e.g., permittivity c or piezoelectric strain constant $d_{ij}$. Based on such models and techniques, the performance of a textured ceramic may be determined. The quantitative result may be expressed in terms of the texture fraction and orientation index. The texture fraction and orientation index may be determined by fitting diffraction data to an equation that comprises the combined expression for the piezoelectric strain constant of barium titanate. Accordingly, a theoretical value for textured ceramic bodies may be determined in order to provide a framework for interpretation of experimental results.

The orientation distribution function of individual deposits may be measured by electron backscatter diffraction. The nanoparticle BTO powder, the coarsened BTO powder, and sintered discs may be characterized by x-ray diffraction (XRD), which may determine a Lot-gering factor. Substrates with plasma spray deposits may be prepared to a colloidal silica finish for electron backscatter diffraction (EBSD) to determine the presence of fiber texture in the deposit, which may be confirmed by XRD measurements. This result is proof on concept for the fabrication method. A fiber textured structure in the deposit may be identified by analysis of the phase transformation from the superheated melt to room temperature. As the deposit cools on a preheated substrate, hexagonal barium titanate may be the first solid to appear in stoichiometric barium titanate. The hexagonal phase may transform to cubic with further cooling and finally to a tetragonal structure near room temperature. The orientation of the final room temperature phase may be based on the initial orientation of the hexagonal phase. A transformation matrix between hexagonal and tetragonal barium titanate may be used to determine the tetragonal orientation. Fiber texture in the deposit may be based on columnar structure and growth in the direction of the hexagonal structure during solidification.

Referring back to FIG. 9, the system circuitry of the system 900 may include any combination of hardware, software, firmware, APIs, and/or other circuitry. The system circuitry may be implemented, for example, with one or more systems on a chip (SoC), servers, application specific integrated circuits (ASIC), field programmable gate arrays (FPGA), microprocessors, discrete analog and digital circuits, and other circuitry. The system circuitry may implement any desired functionality of the system 900. As just one example, the system circuitry may include one or more instruction processor 39 and memory 38. The processor 39 may be one or more devices operable to execute logic. The logic may include computer executable instructions or computer code embodied in the memory 38 or in other memory that when executed by the processor 39, cause the processor 39 to perform the features implemented by the logic. The computer code may include instructions executable with the processor 39. Logic, such as programs or circuitry, may be combined or split among multiple programs, distributed across several memories and processors, and may be implemented in a library, such as a shared library (e.g., a dynamic link library or DLL).

The memory 38 stores, for example, control instructions for executing the features of the disclosed system 900.

Examples of the memory 38 may include non-volatile and/or volatile memory, such as a random access memory (RAM), a read-only memory (ROM), an erasable programmable read-only memory (EPROM), or flash memory. Alternatively or in addition, the memory 38 may include an optical, magnetic (hard-drive) or any other form of data storage device. In one implementation, the processor 39 executes the control instructions to carry out any desired functionality for the disclosed system 900, including without limitation those attributed to data/reflection receiver (e.g., relating to the data receiver circuitry), image generation, and/or profiler results generation. The control parameters may provide and specify configuration and operating options for the control instructions, and other functionality of the computer device 37.

The computer device 37 may further include various data sources, as described herein. Each of the databases that are included in the data sources may be accessed by the system 900 to obtain data for consideration during any one or more of the processes described herein. For example, the data receiver circuitry may access the data sources to obtain the information for generating the images and the reflection returns. In an embodiment, a data receiver circuitry may be configured to receive reflected signals.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

In some embodiments, the computer device 37 may include communication interfaces, system circuitry, input/output (I/O) interface circuitry, and display circuitry. The communication interfaces may include wireless transmitters and receivers (herein, "transceivers") and any antennas used by the transmit-and-receive circuitry of the transceivers. The transceivers and antennas may support Wi-Fi network communications, for instance, under any version of IEEE 802.11, e.g., 802.11n or 802.11ac, or other wireless protocols such as Bluetooth, Wi-Fi, WLAN, cellular (4G, LTE/A). The communication interfaces may also include serial interfaces, such as universal serial bus (USB), serial ATA, IEEE 1394, lighting port, I$^2$C, slimBus, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives. The presently disclosed instructions and code are examples, which may vary as understood by those skilled in the art, that are listed in order to illustrate the nature of certain embodiments.

What is claimed is:

1. A method for fabricating ceramic templates, comprising the steps of:
   loading a canister with ceramic particles;
   closing the canister with a canister lid;
   releasing pressurized inert gas from an inert gas tube into the canister, whereby the ceramic particles are forced through the canister by the inert gas;
   rotating a plate at an end of the canister, the rotating plate having grooves adapted to accelerate and funnel the ceramic particles into a particle tube together with the released inert gas;
   positioning the canister in relation to a plasma torch, wherein the canister and the plasma torch are connected via the particle tube;
   passing the released inert gas together with the ceramic particles through the particle tube and a plasma arc at an end of the plasma torch;
   heating the passed inert gas via the plasma arc to a predetermined temperature, whereby the ceramic particles melt;
   generating a ceramic plasma spray that comprises the melted ceramic particles; and,
   dispensing the ceramic plasma spray unto a substrate, whereby the ceramic plasma spray coats the substrate with a non-equilibrium film, wherein the coated substrate comprises a ceramic template adapted for the production of textured ceramics.

2. The method of claim 1, wherein the dispensing step comprises the steps of:
   propelling the ceramic plasma spray toward the substrate, wherein the ceramic plasma spray is propelled in response to the pressure of the inert gas and the heat generated from heating inert gas and ceramic particles;
   directing the ceramic plasma spray toward the substrate in a sweeping motion, wherein the directed spray impacts the substrate in a substantially even distribution; and,
   generating the non-equilibrium film on the substrate based on the substantially even distribution of the directed spray via the sweeping motion.

3. The method of claim 2, wherein a longitudinal axis of the canister is substantially positioned at a 45 degree angle in relation to a longitudinal axis of the plasma torch, wherein the inert gas is pressurized at 60 psi, and wherein the sweeping motion is performed at a speed of 600 millimeters per second.

4. The method of claim 1, further comprises the steps of:
heating the coated substrate to a predetermined transition temperature; and,
cooling the heated substrate in a gradual and controlled manner, whereby facilitating hardening and uniform crystallographic alignment of the non-equilibrium film.

5. The method of claim 1, wherein a thickness of the non-equilibrium film on the coated substrate is based on kinetic energy from the ceramic plasma spray.

6. The method of claim 1, wherein the non-equilibrium film on the coated substrate is based on a velocity of the melted ceramic particles of the ceramic plasma spray.

7. The method of claim 1, wherein the substrate is polished.

8. The method of claim 1, wherein the substrate comprises a material selected from a group of materials consisting of: polycrystalline ceramic, metal, and single crystal piezocrystals.

9. The method of claim 1, wherein the ceramic particles in the canister are spherical.

10. The method of claim 1, wherein the ceramic particles are transformed into disk-shaped, anisometric particles having a crystallographic orientation.

11. The method of claim 1, wherein the ceramic particles comprise barium titanate ceramic particles.

* * * * *